United States Patent [19]
Grube et al.

[11] Patent Number: 5,557,605
[45] Date of Patent: Sep. 17, 1996

[54] METHOD FOR PROVIDING CALLER DATA IN A TIME DIVISION MULTIPLEXED WIRELESS COMMUNICATION SYSTEM

[75] Inventors: Gary W. Grube, Barrington; Brian K. Bunkenburg, Chicago; Marc C. Naddell, Schaumburg, all of Ill.

[73] Assignee: Motorola, Inc., Schaumburg, Ill.

[21] Appl. No.: 333,919

[22] Filed: Nov. 3, 1994

[51] Int. Cl.⁶ .................................................. H04B 1/56
[52] U.S. Cl. ............................ 370/29; 379/207; 379/265
[58] Field of Search ................................. 370/29, 17, 60, 370/62, 110.1; 379/207, 201, 213, 265; 455/80, 6.3

[56] References Cited

U.S. PATENT DOCUMENTS

| | | | |
|---|---|---|---|
| 4,754,450 | 6/1988 | Lynk, Jr. et al. | 370/29 |
| 5,001,710 | 3/1991 | Gawrys et al. | 379/265 |
| 5,056,086 | 10/1991 | Libonati | 379/213 |
| 5,317,627 | 5/1994 | Richardson, Jr. et al. | 379/207 |

*Primary Examiner*—Benedict V. Safourek
*Assistant Examiner*—Shick Hom
*Attorney, Agent, or Firm*—Christopher P. Moren

[57] ABSTRACT

A source communication unit (101) transmits a voice message to a target communication unit (103) via a first wireless communication resource. In a first embodiment, the target communication unit transmits a caller data request regarding the source communication unit to a central controller (106) via a second wireless communication resource. The central controller determines and interleaves the caller data, via a third wireless communication resource, with the voice message or with a subsequent voice message. In a second embodiment, the caller data request is sent directly to the source communication unit. The source communication unit includes the caller data with a subsequent voice message transmission to the target communication unit.

21 Claims, 3 Drawing Sheets

METHOD FOR PROVIDING CALLER DATA IN A TIME DIVISION MULTIPLEXED WIRELESS COMMUNICATION SYSTEM

FIELD OF THE INVENTION

The present invention relates to time division multiplexed (TDM) wireless communication systems and, in particular, to a method for providing caller data therein.

BACKGROUND OF THE INVENTION

TDM wireless communication systems are know to comprise a central controller that allocates a plurality of wireless communication resources, via base stations operably connected to the central controller, among a plurality of communication units. In such systems, the communication units (i.e., hand-held portable or in-car mobile radios) are assigned wireless communication resources in the form of a radio frequency (RF) carrier divided with respect to time into multiple timeslots. When transmitting a message, it is known in such systems to prefix information regarding the transmitting communication unit to the message. For instance, the push-to-talk identification (PTT ID) or alias name, as are known in the art, are often added to the beginning of a message. In this manner, the transmitting communication unit can provide information about itself, hereinafter referred to as caller data, to the receiving communication unit.

Two shortcomings currently exist with this method of transferring caller data. First, the receiving communication units has no ability to indicate if the caller data is even desired. That is, the receiving communication unit may not want to receive the caller data for every call it receives. This could be the case when two communication units are continuously transmitting and receiving with each other; there is no need to constantly identify the transmitting communication unit.

Second, even if the caller data is desired by the receiving communication unit, it has no control over what kind of caller data it receives. That is, the caller data sent by a transmitting communication unit (e.g., PTT IDs and/or alias names) is typically fixed; no other type of caller data can be sent. It would be useful to allow a user of a receiving communication unit to select the type of caller data received, such as current location, current heading, and current speed information of the transmitting communication unit. Therefore, a need exists for a method that overcomes the shortcomings of prior art methods of providing caller data, and allows caller data to be selectively provided on an as-needed basis.

DESCRIPTION OF A PREFERRED EMBODIMENT

Generally, the present invention provides a method for the selective provision of caller data within a TDM wireless communication system. A source communication unit transmits a voice message to a target communication unit over a first wireless communication resource. In a first embodiment of the present invention, the target communication unit transmits, during transmission of the voice message, a caller data request regarding the source communication unit to a central controller via a second wireless communication resource. Responsive to the caller data request, the central controller determines the caller data and interleaves it, via a third wireless communication resource, with the voice message or with a subsequent voice message.

In a second embodiment of the present invention, the caller data request is sent directly to the source communication unit. The source communication unit includes the caller data with a subsequent voice message transmission to the target communication unit. Both embodiments of the present invention allow caller data to be selectively requested and provided on an as-needed basis.

Figure 1:
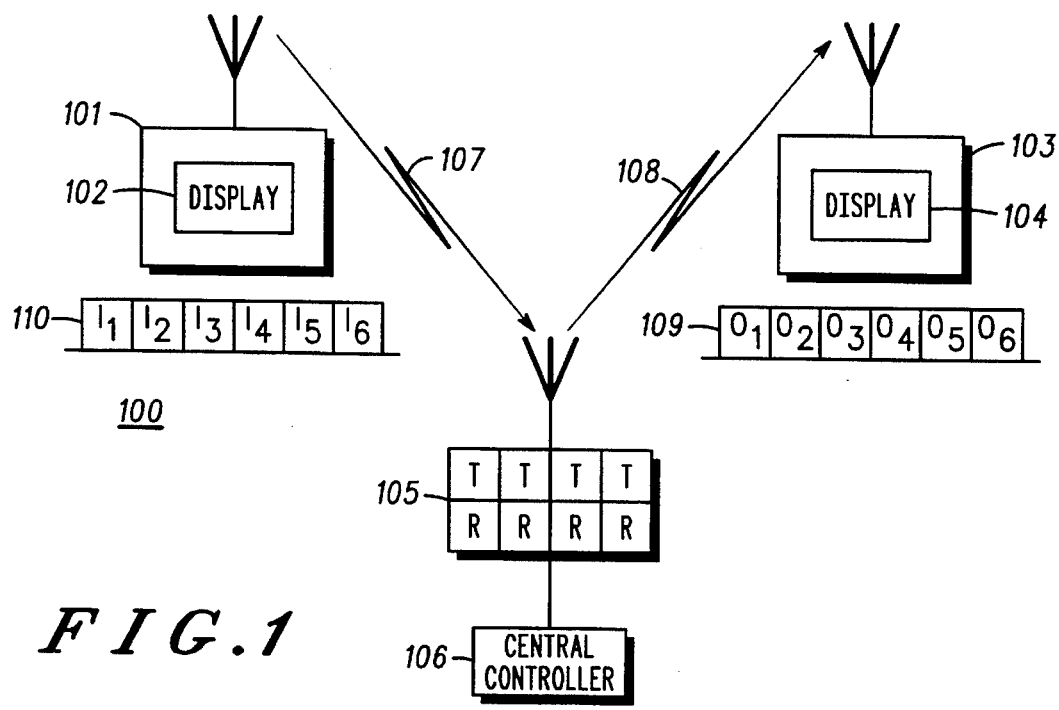
FIG. 1 shows a TDM wireless communication system in which the present invention may be used or applied.

The present invention can be more fully described with reference to FIGS. 1–5. FIG. 1 illustrates a TDM wireless communication system (100) that includes a plurality of communication units (101,103) and a plurality of base stations (105). The communication units (101,103), which can be iDEN™ portable radios by Motorola, Inc., provide voice signals in the form of compressed digital audio. The communication units (101,103) further comprise a display (102, 104), e.g., a liquid crystal display, that allows caller data and/or a set of messages to be displayed.

The base stations (105), which can be iDEN™ base stations by Motorola, Inc., transceive RF carriers (107–108) that are allocated among the communication units (101,103) by a central controller (106). The central controller (106), which can be a iDEN™ Dispatch Application Controller (DAP) by Motorola, Inc., provides the allocation control of wireless communication resources (109) in response to requests from the communication units (101,103).

In a preferred embodiment, the wireless communication resources (109–110) comprise timeslots on the RF carriers (107–108). The wireless communication resources (109–110) are separated into six inbound wireless communication resources ($1_1$–$1_6$) and six outbound wireless communication resources ($O_1$–$O_6$). The number of timeslots (i.e., wireless communication resources) is a design choice; others numbers are possible. The inbound wireless communication resources ($1_1$–$1_6$) are used for communications from the communication units (101,103) to the base stations (105) and central controller (106). The outbound wireless communication resources ($O_1$–$O_6$) are used for communications from the base stations (105) and central controller (106) to the communication units (101,103). The wireless communication resources (109–110) are generally used to communicate control information, such as call requests and call assignments as well as message information, such as compressed digital voice or data. It is also possible to combine both control information and message information into a single timeslot by allocating the proper number of bits for each, as is well known in the art.

Figure 2:
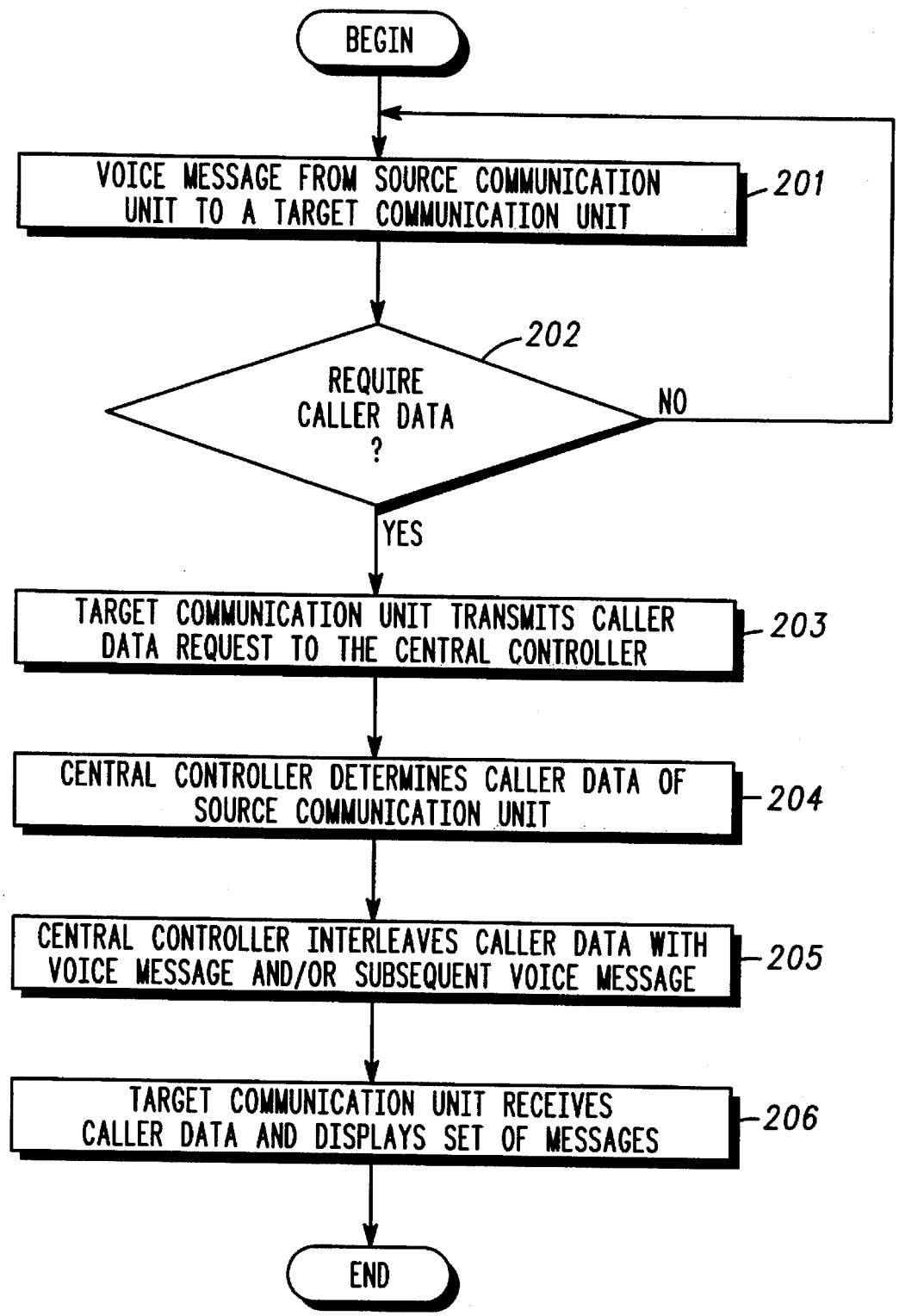
FIG. 2 is a flowchart of a first embodiment of a method in accordance with the present invention.

FIG. 2 illustrates a method in accordance with a first embodiment of the present invention for the provision of caller data. At step 201, a source communication unit (101) transmits a voice message to a target communication unit (103), the voice message including an identification of the source communication unit (101). As is well known in the art of TDM systems, the transmitted portions of the voice message may be received and retransmitted by the base stations (105) (i.e., repeater operation using timeslots $I_2$ and $O_2$, for example), or the transmitted portions of the voice message may be received directly by the target communication unit (103) (i.e., talkaround operation, using only timeslot $I_2$, for example).

At step 202, a user of the target communication unit (103) decides if caller data is required. If caller data is not required, the call proceeds, and additional wireless communication resources that may have been used to provide this caller data are now free to support other communications.

If caller data is required, a caller data request is transmitted to the central controller (106) at step 203. As the inbound and outbound wireless communication resources (109,110) are time-division multiplexed throughout the system (100), transmission of the caller data request can occur during transmission of the voice message. Transmission of the caller data request can be initiated using controls, as known in the art, of the target communication unit (103). The caller data request includes the identification of the source communication unit (101), transmitted with the voice message, as well as an identification of the target communication unit (103). Furthermore, the caller data request can include identifications of specific types of caller data to be provided, as discussed below.

At step 204, the central controller (106) determines the caller data of the first communications unit in response to receiving the caller data request. To this end, the central controller contains a database in memory (not shown) containing the available types of caller data. For instance, using techniques known in the art, the central controller (106) can gather and store caller data relating to the geographic location, heading, speed, or status of any of the plurality of communication units (101,103).

Once the requested caller data has been determined, the central controller (106) interleaves the caller data, at step 205, with the voice message and/or a subsequent voice message from the source communication unit (101) to the target communication unit (103). Interleaving of the caller data with the voice message is achieved using different timeslots on the same RF carrier (107,108), as discussed in further detail below. In the event that the voice message is terminated before the caller data can be interleaved, a subsequent voice message from the source communication unit (101) to the target communication unit (103) can be used for the same purpose. Regardless of when the caller data is conveyed, the identification of the target communication unit (103) is included so that the caller data can be recognized and received by the target communication unit (103) and ignored by other communication units within the system (100).

At step 206, the target communication unit (103) receives the interleaved caller data and displays a set of messages based on the caller data via the display (104). For instance, if the caller data includes the geographic location of the source communication unit (101), the set of messages can include a street address, longitudinal/latitudinal coordinates, or directions to the source communication unit (101). Additionally, messages based on status caller data could include indications of remaining battery life, service capabilities, or warranty information for the source communication unit (101). Using this method, caller data is selectively provided to the target communication unit (103) by the central controller (106).

Figure 3:
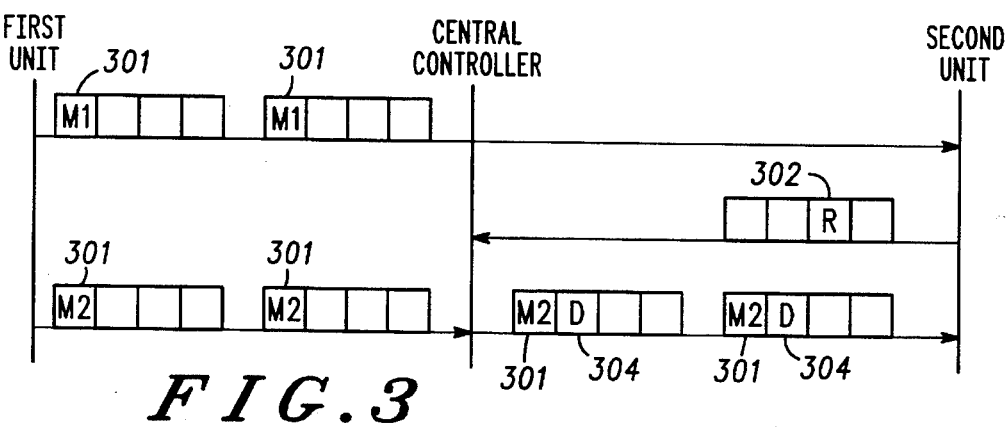
FIG. 3 illustrates an example in accordance with the first embodiment of the present invention.

FIG. 3 shows an example of caller data being provided in accordance with the first embodiment of the present invention illustrated in FIG. 2. In particular, a voice message (M1) is shown being transmitted from a source communication unit to a target communication unit (i.e., talkaround operation) using a first wireless communications resource (301). Although only four wireless communication resources are shown for both the inbound and outbound paths in this example, it is understood that a greater or lesser number of wireless communication resources could be provided. As shown, a user of the target communication unit transmits a caller data request (R) to a central controller using a second wireless communications resource (302). For the purposes of this example, it is assumed that the voice message (M1) is terminated before the caller data is provided to the source communication unit.

Thus, during a subsequent voice message (M2) from the source communication unit to the target communication unit, again using the first wireless communications resource (301), the central controller interleaves the caller data (D) using a third wireless communications resource (304). This is achieved by the central controller detecting the subsequent message (M2) and allocating the third wireless communication resource (304) to transmit the as-yet unsent caller data.

By including an identification of the target communication unit with the caller data, e.g., in a subfield of the timeslots used, the target communication unit recognizes and receives the caller data (D), whereas other communication units may ignore the caller data (D). Similar examples in which the caller data is interleaved with the in-progress voice message and/or during repeater operation can also be shown.

Figure 4:
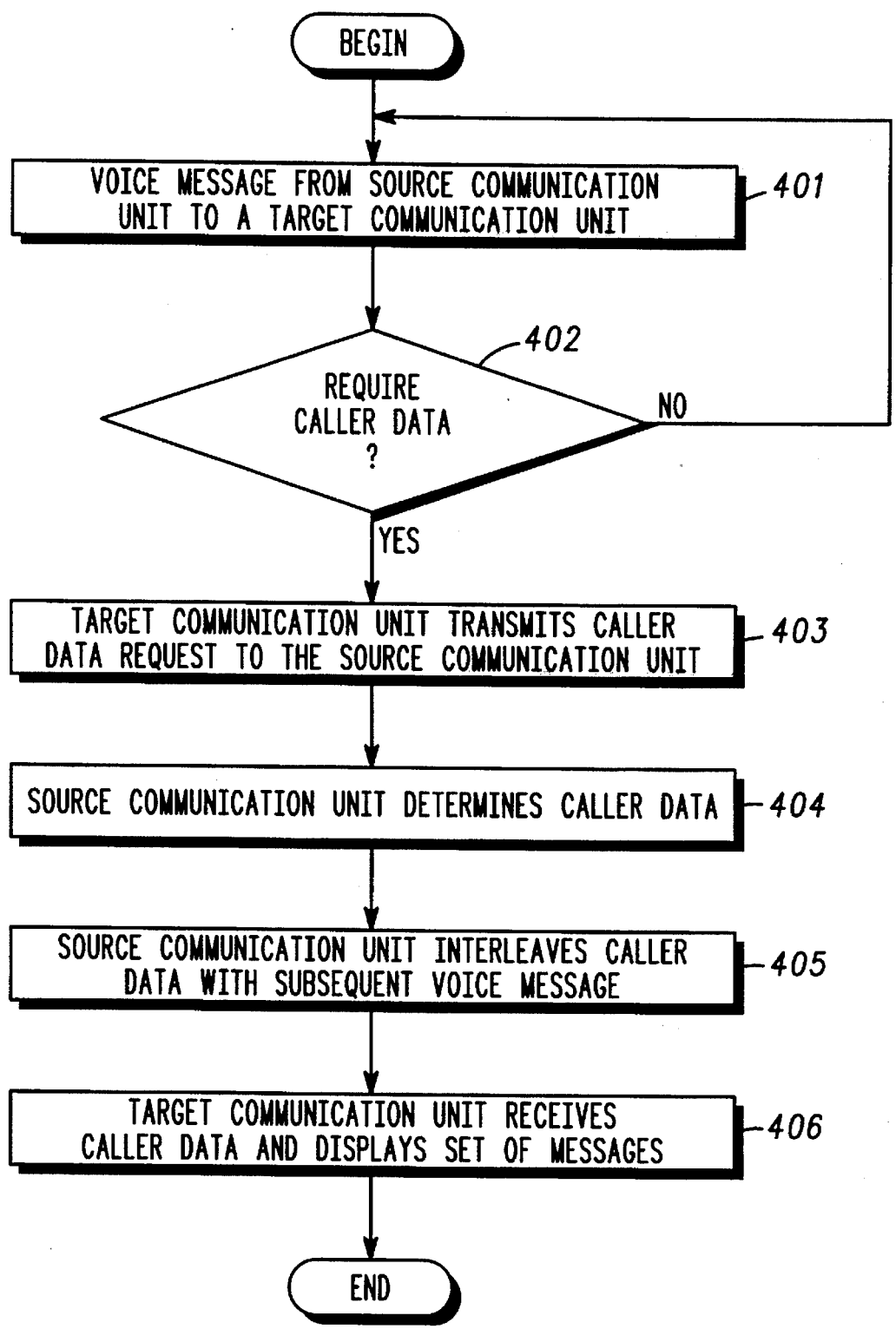
FIG. 4 is a flowchart of a second embodiment of a method in accordance with the present invention.

FIG. 4 illustrates a method in accordance with a second embodiment of the present invention for the provision of caller data. Steps 401 and 402 are substantially identical to steps 201 and 202, respectively, described above. However, if caller data is required, a caller data request is transmitted to the source communication unit (101) at step 403. As in the first embodiment, the caller data request includes the identification of the source communication unit (101) and the identification of the target communication unit (103), as well as identifications of specific types of caller data to be provided.

At step 404, the source communication unit (101) determines the caller data in response to receiving the caller data request. For example, when the source communication unit (101) is equipped with a location determination device, such as a global positioning satellite (GPS) receiver, the source communication unit can determine its geographic location, which location can be provided as caller data if requested. Similarly, status information relating to the source communication unit (101), either stored in memory (not shown) or entered via a data entry device (not shown), may also be provided as caller data.

Once the requested caller data has been determined, the source communication unit (101) interleaves the caller data, at step 405, with a subsequent voice message to the target communication unit (103). As in the first embodiment, the identification of the target communication unit (103) is included so that the caller data can be recognized and received by the target communication unit (103) and ignored by other communication units within the system (100). In order to interleave the caller data with the subsequent voice message, the present invention anticipates that the first communication unit (101) can request a sufficient number of wireless communication resources (110) from the central controller (106).

At step 406, the target communication unit (103) receives the interleaved caller data from the source communication unit (101) and displays a set of messages based on the caller data via the display (104). As in the first embodiment, the messages displayed are dependent upon the caller data transmitted. Using this method, caller data is selectively provided to the target communication unit (103) by the source communication unit (101).

Figure 5:
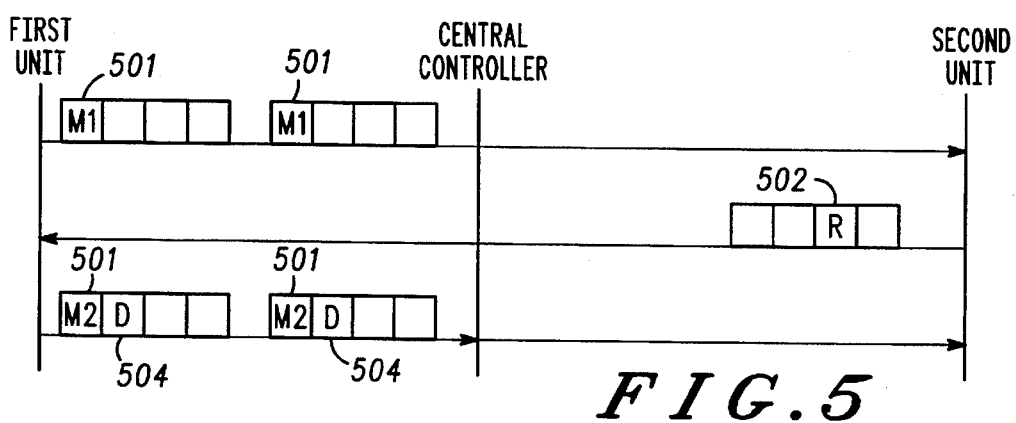
FIG. 5 illustrates an example in accordance with the second embodiment of the present invention.

FIG. 5 shows an example of caller data being provided in accordance with the second embodiment of the present invention illustrated in FIG. 4. In particular, a voice message (M1) is shown being transmitted from a source communication unit to a target communication unit (i.e., talkaround operation) using a first wireless communications resource (501). As before, it is understood that a greater or lesser number of wireless communication resources could be provided than those shown in FIG. 5. A user of the target communication unit transmits a caller data request (R) to the source communication unit using a second wireless communications resource (502).

Thus, during a subsequent voice message (M2) from the source communication unit to the target communication unit, again using the first wireless communications resource (501), the source communication unit interleaves the caller data (D) using a third wireless communications resource (504). By including an identification of the target communication unit with the caller data, e.g., in a subfield of the timeslots used, the target communication unit recognizes and receives the caller data (D), whereas other communication units may ignore the caller data (D). Similar examples during repeater operation can also be shown.

The present invention provides a method for the provision caller data within a TDM wireless communication system. With such a method, the inability to selectively request specific types of caller data regarding a transmitting communication unit are substantially eliminated. The present invention uses the duplex communication attributes of a TDM wireless communication system to allow a receiving communication unit to transmit a request for particular types of caller data. Based on such a request, either a central controller or the transmitting communication unit can determine and convey the requested caller data during ongoing or subsequent voice messages.

We claim:

1. In a TDM wireless communication system that includes a plurality of communication units, a plurality of wireless communication resources, and a central controller that allocates the plurality of wireless communication resources among the plurality of communication units, a method for providing caller data, the method comprising the steps of:

at the central controller:
 a) during transmission of a voice message from a source communication unit of the plurality of communication units to a target communication unit of the plurality of communication units, receiving, via a wireless communication resource of the plurality of wireless communication resources, a caller data request regarding the source communication unit from the target communication unit;
 b) determining caller data of the source communication unit responsive to the caller data request; and
 c) interleaving, via a further wireless communication resource of the plurality of wireless communication resources, the caller data with the voice message.

2. The method of claim 1, wherein step (b) further comprises determining caller data, wherein the caller data includes information regarding a geographic location for the source communication unit.

3. The method of claim 2, further comprising the steps of:
at the target communication unit:
 d) receiving the caller data; and
 e) displaying a set of messages based on the caller data.

4. The method of claim 3, wherein step (e) further comprises the step of displaying, as part of the set of messages, a message indicating directions to the geographic location of the source communication unit.

5. The method of claim 3, wherein step (e) further comprises the step of displaying, as part of the set of messages, a message indicating status of the source communication unit.

6. The method of claim 1, further comprising the step of:
at the central controller:
 e) interleaving, via the further wireless communication resource, the caller data with a subsequent voice message from the source communication unit to the target communication unit.

7. In a TDM wireless communication system that includes a plurality of communication units, a plurality of wireless communication resources, and a central controller that allocates the plurality of wireless communication resources among the plurality of communication units, a method for providing caller data, the method comprising the steps of:

at a source communication unit of the plurality of communication units:
 a) during transmission of a voice message from the source communication unit to a target communication unit of the plurality of communication units, receiving, via a wireless communication resource of the plurality of wireless communication resources, a caller data request regarding the source communication unit from the target communication unit;
 b) determining caller data of the source communication unit responsive to the caller data request; and
 c) interleaving, via a further wireless communication resource of the plurality of wireless communication resources, the caller data with subsequent voice message from the source communication unit to the target communication unit.

8. The method of claim 7, wherein step (b) further comprises determining caller data, wherein the caller data includes information regarding a geographic location for the source communication unit.

9. The method of claim 8, further comprising the steps of:
at the target communication unit:
 d) receiving the caller data; and
 e) displaying a set of messages based on the caller data.

10. The method of claim 9, wherein step (e) further comprises the step of displaying, as part of the set of messages, a message indicating directions to the geographic location of the source communication unit.

11. The method of claim 9, wherein step (e) further comprises the step of displaying, as part of the set of messages, a message indicating status of the source communication unit.

12. In a TDM wireless communication system that includes a plurality of communication units, a plurality of wireless communication resources, and a central controller that allocates the plurality of wireless communication resources among the plurality of communication units, a method for displaying caller data, the method comprising the steps of:

at a target communication unit of the plurality of communication units:

a) transmitting, via a wireless communication resource of the plurality of wireless communication resources, a caller data request regarding a source communication unit of the plurality of communication units, wherein the source communication unit is transmitting a voice message to the target communication unit;

b) receiving, via another wireless communication resource of the plurality of wireless communication resources, the caller data responsive to the caller data request; and c) displaying a set of messages based on the caller data.

13. The method of claim 12, wherein step (a) further comprises the step of transmitting the caller data request to the central controller.

14. The method of claim 13, wherein step (b) further comprises the step of receiving the caller data, wherein the central controller interleaves the caller data with the voice message.

15. The method of claim 13, wherein step (b) further comprises the step of receiving the caller data, wherein the central controller interleaves the caller data with a subsequent voice message from the source communication unit to the target communication unit.

16. The method of claim 12, wherein step (a) further comprises the step of transmitting the caller data request to the source communication unit.

17. The method of claim 13, wherein step (b) further comprises the step of receiving the caller data responsive to the caller data request, wherein the source communication unit interleaves the caller data with a subsequent voice message from the source communication unit to the target communication unit.

18. In a TDM wireless communication system that includes a plurality of communication units, a plurality of wireless communication resources, and a central controller that allocates the plurality of wireless communication resources among the plurality of communication units, a method for providing caller data, the method comprising the steps of:

a) communicating, by a source communication unit of the plurality of communication units, a voice message to a target communication unit of the plurality of communication units via a first wireless communication resource of the plurality of wireless communication resources;

b) during transmission of the voice message, transmitting, by the target communication unit to the central controller via a second wireless communication resource of the plurality of wireless communication resources, a caller data request regarding the source communication unit;

c) determining, by the central controller, the caller data of the source communication unit responsive to the caller data request; and d) interleaving, by the central controller via a third wireless communication resource of the plurality of wireless communication resources, the caller data with the voice message.

19. The method of claim 18, wherein step (a) further comprises the step of communicating via the first wireless communication resource, wherein the first wireless communication resource comprises a first time slot on a first radio frequency carrier.

20. The method of claim 19, wherein step (b) further comprises the step of transmitting via the second wireless communication resource, wherein the second wireless communication resource comprises a first time slot on a second radio frequency carrier.

21. The method of claim 20, wherein step (d) further comprises the step of interleaving via the third wireless communication resource, wherein the third wireless communication resource comprises a second time slot on the first radio frequency carrier.

* * * * *